Oct. 24, 1961 S. T. MORELAND 3,005,716
METHOD FOR MAKING SKINLESS SAUSAGES
Filed Sept. 2, 1958 5 Sheets-Sheet 3

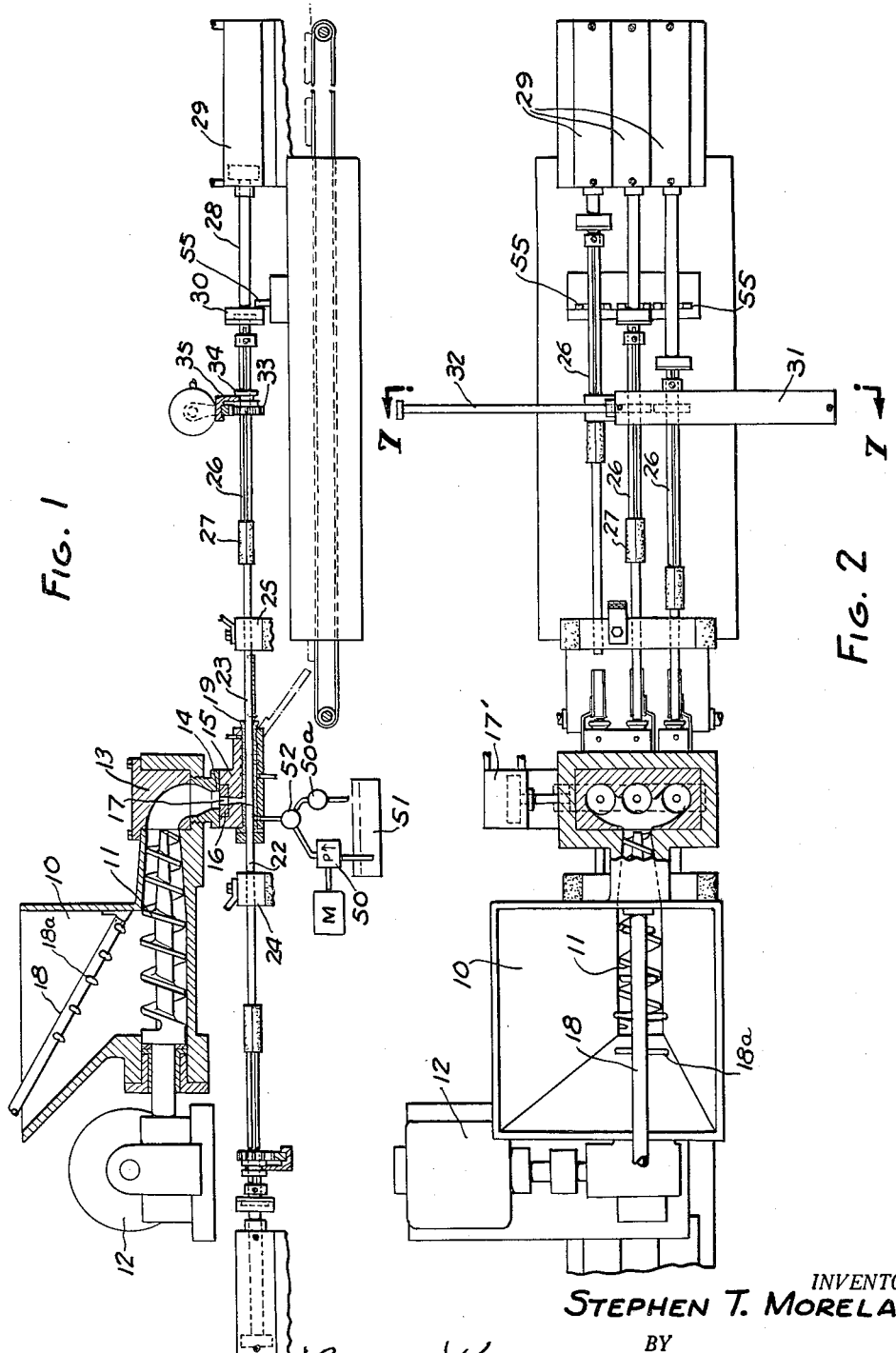

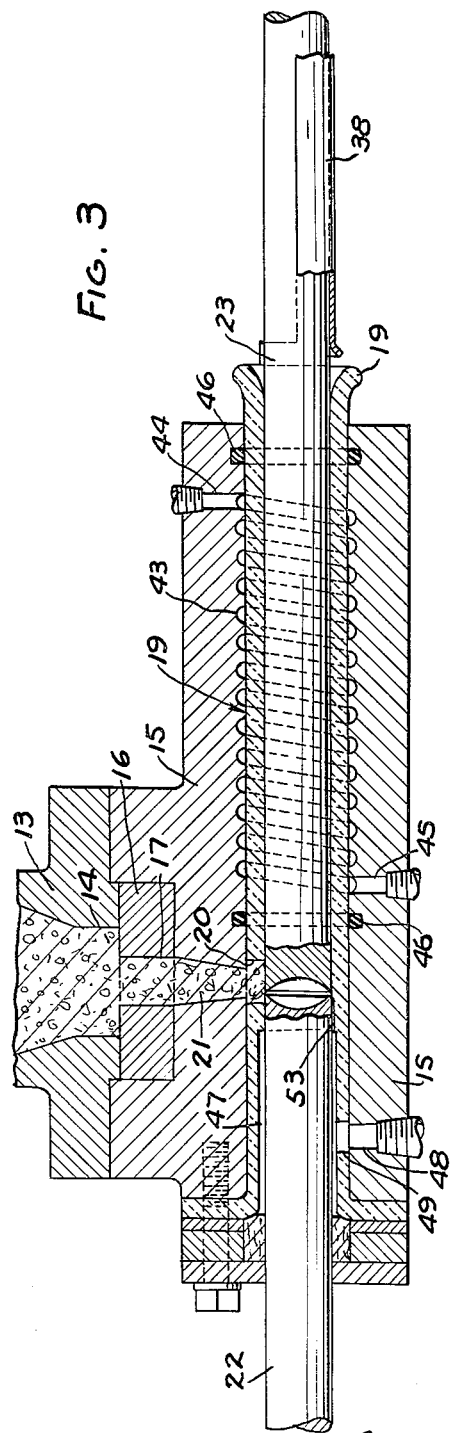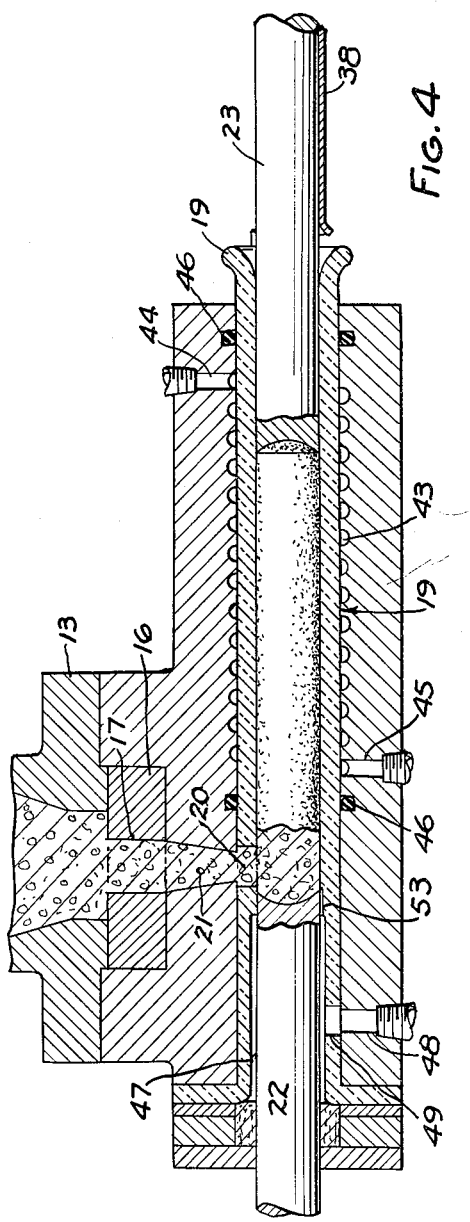

INVENTOR.
STEPHEN T. MORELAND
BY
Barnes, Kisselle, Raisch & Choate
ATTORNEYS

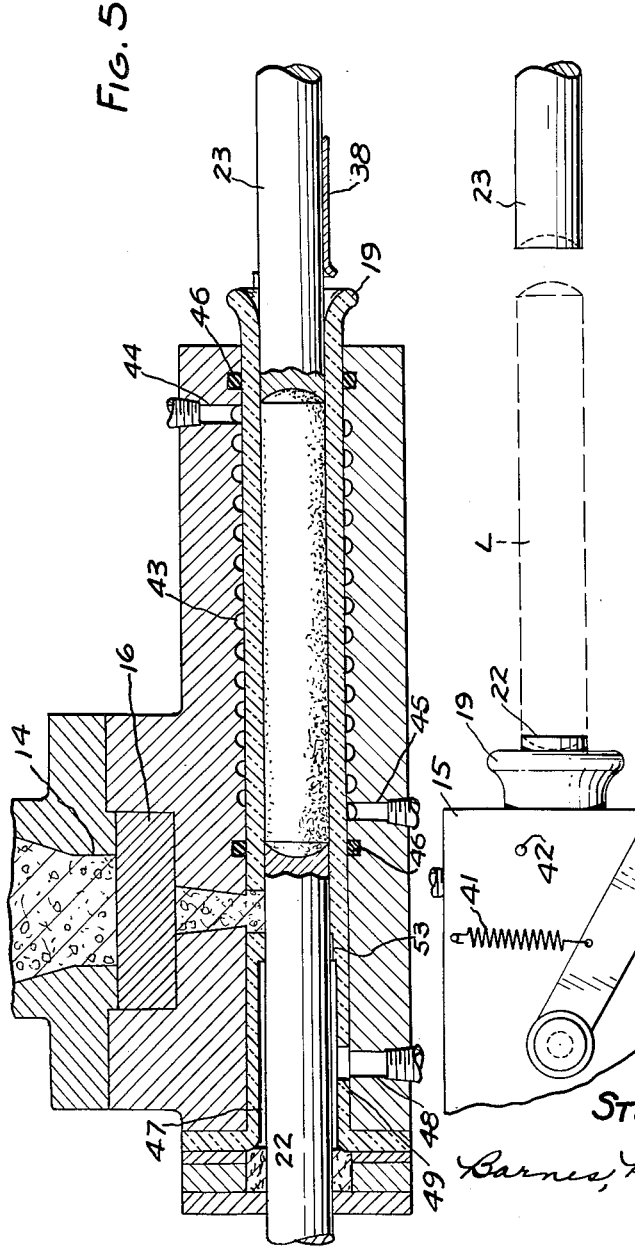

Oct. 24, 1961 S. T. MORELAND 3,005,716
METHOD FOR MAKING SKINLESS SAUSAGES
Filed Sept. 2, 1958 5 Sheets-Sheet 5

INVENTOR.
STEPHEN T. MORELAND
BY
Barnes, Kisselle, Raisch, & Choate
ATTORNEYS

3,005,716
METHOD FOR MAKING SKINLESS SAUSAGES
Stephen T. Moreland, Wethersfield, Conn.
(6719 S. Oglesby Ave., Chicago 49, Ill.)
Filed Sept. 2, 1958, Ser. No. 758,178
2 Claims. (Cl. 99—109)

This invention relates to a method and apparatus for making skinless sausages such as frankfurters.

Skinless sausages such as frankfurters are so named because they do not have a distinct sausage casing. Such skinless sausages are, however, usually made by using a temporary casing which is used during the cooking to confine the sausage emulsion and is removed before the sausage is packaged for the consumer. The use of such a temporary casing adds to the cost of skinless sausage and, in addition, requires additional handling in the manufacture thereof.

In the making of a skinless sausage it is desirable that the outermost layer or surface of the sausage be sufficiently jelled or tenacious so that the sausage will retain its shape, will not easily dry out and will remain soft and retain the natural juices of the meat.

It is an object of this invention to provide a novel method and apparatus for making skinless sausage wherein the sausage emulsion is quickly coagulated and sterilized without the use of a casing and the resultant product has a good appearance and taste.

In the drawings:

FIG. 1 is a part sectional, generally diagrammatic elevational view of an apparatus for performing the method and embodying the invention.

FIG. 2 is a part sectional plan view of the apparatus shown in FIG. 1.

FIG. 3 is an enlarged sectional view of a mold portion of the apparatus.

FIGS. 4 and 5 are views similar to FIG. 3 showing the parts in different positions.

FIG. 6 is an elevational view on an enlarged scale of a portion of the apparatus shown in FIG. 1.

Figure 7:
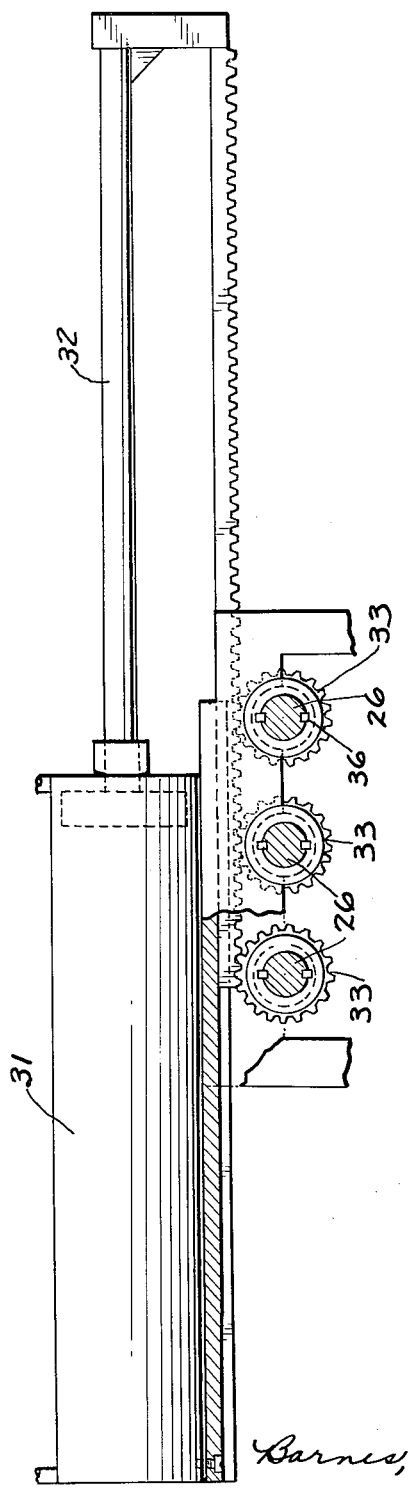
FIG. 7 is a sectional view taken along the line 7—7 in FIG. 2.

Referring to FIGS. 1 and 2, the apparatus for performing the method comprises a hopper 10 to which a sausage emulsion is supplied. A screw feeder 11 driven by a motor and reduction unit 12 is provided in the lower part of the hopper 10 and, upon rotation, feeds the emulsion to a distributor head 13. The emulsion then flows through orifices 14 in head 13 to mold body 15. A valve plate 16 having openings 17 therein is provided adjacent the openings 14 for controlling the flow of emulsion therethrough into the body 15. Fluid piston 17' is operatively connected to the valve plate 16. If desired, a smoke distributor 18 having longitudinally spaced smoke discharge pipes 18a may be provided in the hopper 10 to produce a smoked flavor in the sausage emulsion.

Referring to FIGS. 3, 4 and 5, a generally cylindrical tube 19 of non-conductive material is mounted in mold body 15 and has the ends thereof extending beyond the ends of the mold body. Tube 19 is formed with an opening 20 at one side thereof which communicates with an opening 21 so that the sausage emulsion may flow successively through opening 14 in distributor 13, opening 17 in the valve plate 16, opening 21 in the mold body 15, and opening 20 in the tube 19 to the interior of the tube.

Plungers 22, 23 are mounted for rotation and reciprocation within the tube 19. The adjacent ends of plungers 22, 23 are concave and have the general curvature which is desired on the end of a link of sausage so that when sausage emulsion is introduced into the tube 19 as the plungers 22, 23 are moved apart, the material is given the general shape of the link which is to be formed.

As shown in FIGS. 1 and 2, means are provided for supplying electrical current to the plungers 22, 23 and thereby heat the emulsion by passing a current therethrough. This may be done in any suitable manner but, as shown in FIG. 1, comprises electrodes 24, 25 which are mounted in fixed position and through which the plungers 22, 23 extend respectively. The plungers 22, 23 are made of a high resistance material such as stainless steel.

Means are provided for rotating and reciprocating the plungers. This means is identical and, for purposes of clarity, only the means for rotating and reciprocating plungers 23 will be described.

As shown in FIGS. 1 and 2, each plunger 23 has its end opposite tube 19 fixed to an intermediate rod section 26 by an insulated coupling 27. Intermediate rod section 26 is, in turn, connected to the end of a piston rod 28 of a piston motor 29 by a slip joint 30. The second piston motor 31 is mounted with its rod 32 at right angles to the sections 26, the rod 32 having a rack formed thereon which engages pinions 33 on intermediate sections 26. Pinions 33 are prevented from being reciprocated with the rods 26 by engagement of the hub 34 thereof with a flanged bracket 35 extending longitudinally of the motor 31. Pinions 33 are fixed against rotation relative to the intermediate sections 26 by keys 36 (FIG. 7). By this arrangement, piston motors 29, upon being actuated, reciprocate the plungers 23 while piston motors 31, upon being actuated, rotate the plungers 23, so that the plungers simultaneously reciprocate and rotate. Any other means for simultaneously reciprocating and rotating the plungers may be used.

As shown in FIG. 6, a guide 37 is pivoted adjacent one end of the tube 19 and is provided with a guide surface 38 onto which a link L which has been formed and discharged as presently described falls and is guided to a conveyor 39 which then carries the link L to subsequent operation, such as through a cooler 40. Tension spring 41 normally holds the guide 37 in a substantally horizontal position against a stop pin 42 on the mold body 15.

Referring to FIGS. 3, 4 and 5, means are provided for additionally heating the external surface of the molding portion of tube 19 which extends between opening 20 and one end thereof and comprises a helical groove 43 formed in the inner surface of the cavity into which tube 19 extends. Radial passageways 44, 45 are provided in the mold body 15 and communicate with the ends of groove 43 so that heated liquid may be circulated through the groove 43 to heat the external surface of the tube 19. O rings 46 are provided adjacent the ends of the helical groove 43 to prevent the liquid from passing between the mold body 15 and the tube 19.

Means are also provided for lubricating the plunger 22 and comprise a cylindrical cut-away portion or groove 47 in the tube 19 adjacent the end opposite said portion of the tube which is heated by the helical groove 43. A passageway 48 in the mold body 15 registers with an opening 49 in the tube 19 which, in turn, communicates with the groove 47. As shown in FIG. 1, a motor-operated pump 50 may be provided to supply a lubricant such as liquid silicone from a supply tank 51 through a valve 52 to the passageway 48. A pump 50a is provided to remove the lubricant and exhaust the air from the space between the ends of the plungers 22, 23. Valve 52 may be of a well-known type to provide selective operation of pump 50 so that lubricant may be supplied to the recess 47 or removed therefrom. As shown in FIGS. 3, 4 and 5, a small relief passageway 53 is provided at one end of recess 47 adjacent opening 20 to permit air to be extracted and thereby prevent air from being entrapped with the sausage material which is being formed as presently described.

The operation of the apparatus in performing the method can best be understood by referring to FIGS. 3, 4 and 5 which show the relative positions of the various parts during various portions of the forming cycle.

In the beginning of the cycle, as shown in FIG. 3, the free ends of the plungers 22, 23 are in close proximity adjacent opening 20, the end of plunger 22 being positioned adjacent the left edge of the opening 20 as viewed in FIG. 3. Valve plate 16 is in position with the openings 17 thereof in register with the openings 14, 21 and 20. The piston which controls plunger 22 is then retracted slightly to bring the end of the plunger adjacent passageway 53 and the piston which controls plunger 23 is actuated to retract plunger 23 and thereby permit the sausage emulsion to be introduced into tube 19. As the end of plunger 23 moves further away from the end of plunger 22, the resultant cavity is immediately filled with sausage emulsion. Any air in the cavity is exhausted through relief passageway 53, the exhausting of the air being facilitated by operation of the pump 50a.

After plunger 23 has been retracted to the desired position so that the required amount of sausage emulsion is provided in tube 19, a retractable stop 55 is moved in position to limit any further movement of plunger 23 and plunger 22 is moved to the right as shown in FIG. 5 closing opening 20, while valve plate 16 is moved to a closed position. This compacts and compresses the sausage emulsion to a position adjacent the helical groove 43. At this time, electrical current is supplied to the electrodes 24, 25 thereby causing a current to flow through the plungers 22, 23 and, in turn, through the sausage material to coagulate and sterilize the sausage emulsion.

This heating is assisted by the passage of the heated liquid through the helical groove 43. After a predetermined period of time, the supply of electrical current to the electrodes and, in turn, the plungers is interrupted, stop 55 is retracted and the plungers 22, 23 are moved further to the right, as shown in FIG. 6, to completely eject the link L from the tube 19 to permit it to fall by gravity onto the guide surface 38 and be guided by movement of the guide 37 downwardly onto the conveyor 39.

Throughout the application of heat to the sausage emulsion, the hydraulic pressure on plunger 22 is maintained thereby insuring a pressure on the ends of the link so that proper compacting of the sausage emulsion is achieved with a resultant homogeneous link.

In the case of sausages which are commonly known as frankfurters, the desired temperature to which the sausage material is heated ranges from 152° to 155° F.

Throughout the application of electrical current and the contact of the plungers 22, 23 with the sausage material, the plungers are rotated. This rotation may comprise a continuous rotation in one direction but preferably comprises a rotation first in one direction and then in the other. For example, the plungers may be rotated several revolutions in one direction and several revolutions in the opposite direction. This may continue throughout the cycle.

After the link has been ejected, plunger 23 is moved to the left into abutting contact with plunger 22 and then they are moved together to the position shown in FIG. 3. The valve plate 16 is then opened and the apparatus is in position for beginning another cycle.

I have found that when a current of 1,000 volts, 10 amps. and 60 cycle, 3 phase is applied to the plungers, satisfactory coagulation and sterilizing of the link is provided. A typical cycle is as follows:

1½ seconds _____ filling.
1½ seconds _____ heating and partly moving to the edge of the cylinder.
1½ seconds _____ expelling and returning to original position.

Where three phase power is utilized, I have found it best to use the tubes or cylinders in banks of three. It may be appreciated that where a three phase power is used a more efficient utilization of power will be achieved by using three banks of cylinders, the cycle of each bank being adjusted so that the power is applied successively to each bank.

It should be appreciated that a more conventional feeder mechanism may be used in place of the screw feeder 11. For example, a feeder which is commonly known as a "stuffer" may be used. Such a feeder comprises a chamber containing sausage emulsion to which air under pressure is provided to force the emulsion out of the chamber.

Figure 8:
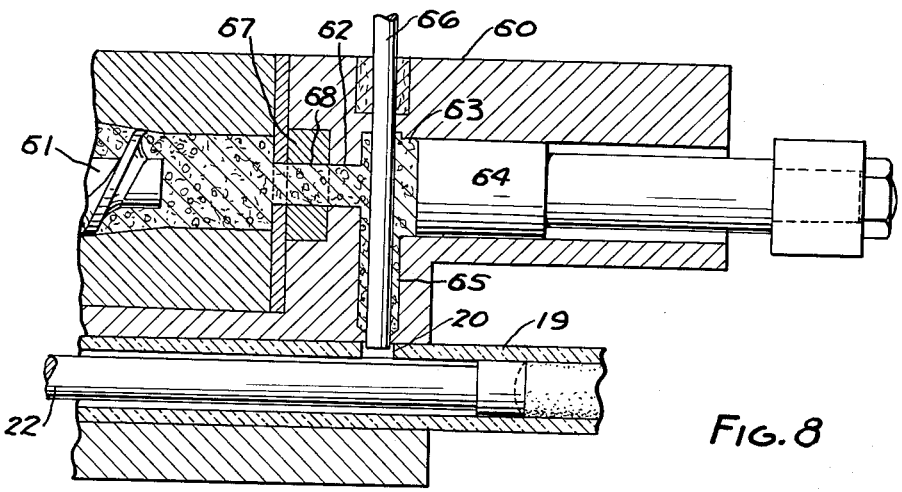
FIG. 8 is an enlarged sectional view of a modified mold changing mechanism.
Figure 9:
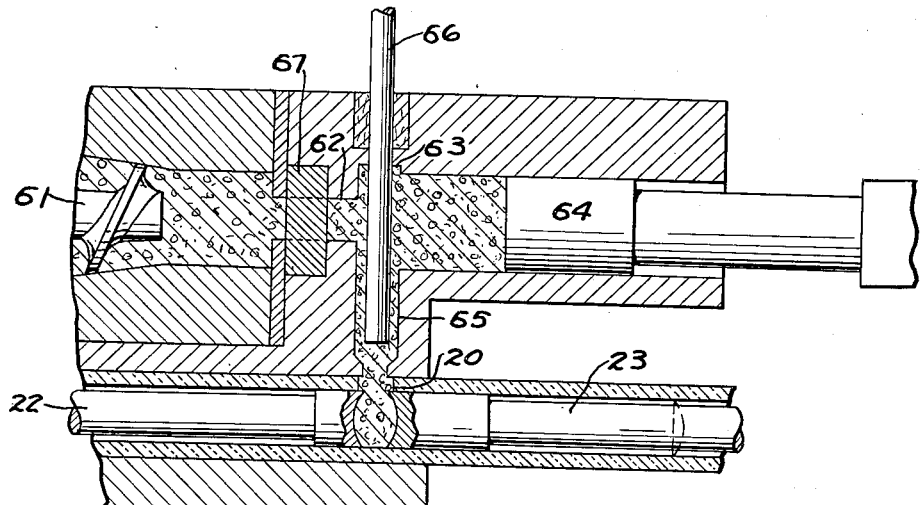
FIG. 9 is a view similar to FIG. 7 showing the parts in a different operative position.

Alternatively, a distributor head such as shown in FIGS. 8 and 9 may be used wherein the sausage emulsion is first fed to an intermediate piston chamber and then fed by movement of the piston in the chamber into the interior of the tubes. As shown in FIGS. 8 and 9, tube 19 is positioned in a mold body 60 mounted adjacent screw 61 which feeds sausage emulsion through a passageway 62 to an intermediate chamber 63 in which a piston 64 is reciprocated by a suitable operating mechanism which is a hydraulic motor. Intermediate chamber 63 is connected to opening 20 in tube 19 by a passageway 65 and a reciprocable valve plunger 66 operates in passageway 65 to open and close communication to the opening 20. A valve plate 67 having an opening 68 is provided to control communication between the supply of emulsion from screw 61 and chamber 63 in passageway 65.

In operation, valve plate 67 is moved so that emulsion will flow into the chamber 63, during this time valve plunger 66 is in its lowered position and piston 64 moves to the right increasing the size of intermediate chamber 63. Valve plate 67 is then shifted to cut off the flow of emulsion from the screw 61, valve plunger 66 is elevated and piston 64 is moved to the left to force a predetermined amount of emulsion from the intermediate chamber 63 through passageway 65 into the tube. Plunger 22 is then moved to the right cutting off communication, valve plunger 66 is lowered and valve plate 67 is moved to permit emulsion to flow from the screw 61. In this manner, the charge of emulsion may be provided to the intermediate chamber 63 while the previously fed emulsion is in the tube and is being coagulated and sterilized.

It can thus be seen that I have provided a method and apparatus for forming a skinless sausage such as a frankfurter quickly and without the use of temporary casings or the like.

The application of heat by means of the electrodes on the ends of the sausage and external heat through the non-conductive mold walls insures the proper sterilization and coagulation of the emulsion. A tenacious skin is formed on the surface of the sausage to insure a proper retention of its shape. The contact of the hot plungers 22, 23 with the ends of the sausage insures a smooth appearing sausage not only throughout its length but on the ends.

I claim:

1. The method of making a skinless sausage which comprises introducing a measured quantity of sausage emulsion into a mold to form a link, applying a continuous pressure to the ends of the link, heating the sausage emulsion by applying an electrical current through the sausage emulsion between the ends of the link while simultaneously heating by conduction through the mold, continuing the application of heat and pressure until the sausage emulsion is coagulated and sterilized to self-sustaining form, and removing the coagulated and sterilized link from the mold.

2. The method of making a skinless sausage which comprises introducing a measured quantity of sausage emulsion into a mold cavity having the shape of the link which is to be formed sufficient to fill the mold, applying heat to the link while it is within the confines of the cavity by supplying electrical current to the ends, applying additional heat by conduction to the portion of the link between the ends simultaneously with the application of heat to the ends, continuing the application of the heat by electric current and by conduction until the sausage emulsion is coagulated and sterilized to form a self-sustaining link.

References Cited in the file of this patent

UNITED STATES PATENTS

| | | |
|---|---|---|
| 1,009,953 | Boyle | Nov. 28, 1911 |
| 2,182,211 | Paddock | Dec. 5, 1939 |
| 2,623,451 | Prohaska | Dec. 30, 1952 |
| 2,685,518 | Prohaska | Aug. 3, 1954 |
| 2,877,118 | Hensgen et al. | Mar. 10, 1959 |